US008729172B2

(12) United States Patent
Schmaucks et al.

(10) Patent No.: US 8,729,172 B2
(45) Date of Patent: May 20, 2014

(54) HIGH PERFORMANCE ENGINEERING PLASTICS AND ADDITIVE FOR USE IN ENGINEERING PLASTICS

(75) Inventors: Gerd Schmaucks, Sogne (NO); Jan Olaf Roszinski, Sogne (NO)

(73) Assignee: Elkem AS, Oslo (NO)

( * ) Notice: Subject to any disclaimer, the term of this patent is extended or adjusted under 35 U.S.C. 154(b) by 1039 days.

(21) Appl. No.: 11/718,590

(22) PCT Filed: Dec. 28, 2004

(86) PCT No.: PCT/NO2004/000401
§ 371 (c)(1),
(2), (4) Date: May 3, 2007

(87) PCT Pub. No.: WO2006/052138
PCT Pub. Date: May 18, 2006

(65) Prior Publication Data
US 2008/0153968 A1    Jun. 26, 2008

(30) Foreign Application Priority Data
Nov. 3, 2004    (NO) .................................. 20044760

(51) Int. Cl.
*B60C 1/00* (2006.01)
*C07F 9/24* (2006.01)
*C08K 9/04* (2006.01)
*C08J 3/22* (2006.01)

(52) U.S. Cl.
USPC ........... 524/492; 524/138; 524/445; 524/451; 524/493

(58) Field of Classification Search
USPC ......... 524/492, 101, 127, 138, 148, 139, 430, 524/432, 437, 443, 444, 445, 449, 451, 455, 524/493, 494, 497, 500, 504, 513, 571, 524/914; 428/44; 525/72, 100, 185, 189, 525/190, 209, 425, 474, 479, 536, 539
See application file for complete search history.

(56) References Cited

U.S. PATENT DOCUMENTS

| | | | |
|---|---|---|---|
| 3,833,535 A | 9/1974 | Wambach | |
| 4,301,060 A | 11/1981 | Underwood et al. | |
| 4,414,352 A * | 11/1983 | Cohen et al. | 524/443 |
| 4,539,124 A | 9/1985 | Butcher et al. | |
| 4,704,418 A | 11/1987 | Gomez | |
| 4,861,858 A * | 8/1989 | Kock et al. | 528/193 |
| 4,920,164 A * | 4/1990 | Sasaki et al. | 523/466 |
| 5,208,292 A * | 5/1993 | Hert et al. | 525/166 |
| 5,321,099 A * | 6/1994 | Goldwasser et al. | 525/432 |
| 5,567,749 A * | 10/1996 | Sawamura et al. | 523/443 |
| 5,707,734 A | 1/1998 | Hawkins et al. | |
| 5,972,811 A * | 10/1999 | St. Lawrence et al. | 442/237 |
| 6,005,052 A * | 12/1999 | Venkataswamy et al. | 525/166 |
| 6,133,378 A * | 10/2000 | Davis et al. | 525/240 |
| 6,214,904 B1 * | 4/2001 | Tanaka et al. | 523/409 |
| 2002/0111403 A1 * | 8/2002 | Gosens et al. | 524/101 |

FOREIGN PATENT DOCUMENTS

| | | |
|---|---|---|
| WO | 9927015 A | 6/1999 |
| WO | 0027911 | 5/2000 |
| WO | 03104317 Y | 12/2003 |

OTHER PUBLICATIONS

Wypych, George (2000). Handbook of Fillers—A Definitive User's Guide and Databook (2nd Edition). ChemTec Publishing. p. 132 Online version available at: http://knovel.com/web/portal/browse/display?_EXT_KNOVEL_DISPLAY_bookid=1011 &VerticalID=0.*
Novacite Product Information. (Apr. 16, 2009) Malvern Minerals Co. Available Online at: http://www.malvernminerals.com.*

* cited by examiner

*Primary Examiner* — Ling Choi
*Assistant Examiner* — Thuy-Ai Nguyen
(74) *Attorney, Agent, or Firm* — Lucas & Mercanti, LLP

(57) ABSTRACT

The present invention relates to engineering plastics having a high flame retardancy and a good compound processability, where the engineering plastics comprises microsilica as a flame retardant additive and as a processing aid.

3 Claims, No Drawings

HIGH PERFORMANCE ENGINEERING PLASTICS AND ADDITIVE FOR USE IN ENGINEERING PLASTICS

TECHNICAL FIELD

The present invention relates to high performances engineering plastics having an improved flame retardancy and to an additive for engineering plastics.

BACKGROUND ART

Engineering plastics are widely used in several high performance applications due to their specific properties like thermal stability, impact resistance and tensile strength. Engineering plastics do, however, also have disadvantages, such as difficult processing, high water absorption and high flammability.

Engineering plastic are thermoplastics which have mechanical, chemical and thermal properties, maintain dimensional stability, and are suitable for conditions under high impact, heat or moisture. They include acetals, polycarbonates (PC), polyphenylsulfides, polysulfones, modified polyphenylene oxides, polyimides, polyamides (PA), polybutylene terephthalate (PBT), acrylonitrile-butadiene-styrene (ABS), liquid crystal polymers (LCP), ethylene vinylacetate copolymer (EVA) and other plastics used for engineering purposes.

In order to improve the flame retardancy of engineering plastics halogen- or phosphorus containing organic compounds or red phosphorus is used. These additives do, however, have some serious disadvantages. Thus in the event of a fire, toxic and corrosive gases are released that can harm both people and environment. In addition the mechanical properties and processability of the engineering plastics are reduced. Also non-toxic additives such as aluminium trihydrate, magnesium hydroxide and glass fibres are used to improve flame retardancy of engineering plastics, but even though not toxic they can harm the mechanical properties and the processability of engineering plastics.

In order to maintain the mechanical properties, additives like fillers such as talc or wollastonite or fibres such as glass fibres or carbon fibres, are added to the compound for producing engineering plastics, but the incorporation of these materials gives rise to other negative effects, one such disadvantage being a high compound viscosity giving a reduced processing speed. The optimisation of compound properties and processing behaviour and the performance of final article made from these engineering plastic compounds are therefore very difficult.

DESCRIPTION OF INVENTION

By the present invention it is provided engineering plastics having a substantial increased flame retardancy while at the same time maintaining the processability of the compound and the mechanical properties of the engineering plastics. Moreover, the engineering plastics of the present invention do not release toxic or corrosive gases in the event of a fire. By the present invention it is further provided an additive for engineering plastics which substantially improves the flame retardancy of engineering plastics without negatively effecting processability of the compound and mechanical properties of the engineering plastics.

The present invention thus relates to engineering plastics having a high flame retardancy and good compound processability, characterized in that the engineering plastics comprises microsilica as a flame retardant additive.

According to a preferred embodiment the engineering plastics contain 5-100% by weight of microsilica and more preferably 8 to 50% by weight of microsilica as a flame retardant.

According to another embodiment the engineering plastics comprises a combination of microsilica and conventional flame retarding agents. The invention further relates to the use of microsilica as a flame retardant additive in engineering plastics.

The term microsilica used in the specification and claims of this application is particulate amorphous $SiO_2$ obtained from a process in which silica (quartz) is reduced to SiO-gas and the reduction product is oxidised in vapour phase to form amorphous silica. Microsilica may contain at least 70% by weight silica ($SiO_2$) and has a specific density of 2.1-2.3 $g/cm^3$ and a surface area of 15-50 $mg^2/g$. The primary particles are substantially spherical and have an average size of about 0.15 μm. Microsilica is preferably obtained as a coproduct in the production of silicon or silicon alloys in electric reduction furnaces. The microsilica is recovered in conventional manner using baghouse filters or other collection apparatus and may be further processed by removing coarse particles, surface modification and others.

It has surprisingly been found that the addition of microsilica substantially reduces the flammability of engineering plastics without negatively effecting the mechanical properties of the engineering plastics and without reducing processability of the compound. In this connection it has particularly been found that microsilica gives a far better flame retardancy than glass fibres, even though both are silicon dioxide materials. It has further been found that the engineering plastics of the present invention do not release toxic or corrosive gases in the event of a fire. Finally it has been found that using a combination of microsilica and other known flame retardants like aluminium trihydrate or magnesium hydroxide, it is obtained a combined effect on the flame retardancy of the engineering plastics.

The present invention further relates to the use of microsilica as an additive to engineering plastics to improve the flame retardancy of the engineering plastics.

DETAILED DESCRIPTION OF INVENTION

Example 1

Polyamide engineering plastics were made from a polyamide polymer PA6 delivered by BASF.

Different amounts of microsilica were added to the PA6 polymer to produce samples A and B according to the invention. Two other samples, E and F, according to the invention were made by adding different amounts of both microsilica and glass fibres. The limiting oxygen index (LOI) was measured according to BS EN 4589-2:199 and the glowing wire ignition temperature (GWIT) of the produced polyamide plastic was measured according to BS EN 6095-2-13:2001. In addition the flexural modulus and impact strength were measured. For comparison purposes two samples, C and D, of the polyamide plastic containing only glass fibres were produced and tested in the same way described above.

The composition of the samples and the limiting oxygen index, the glowing wire ignition temperature, the flexural modulus and the impact strength are shown in Table 1.

TABLE 1

| Sample | PA6 wt % | Microsilica wt % | Glass-fibre wt % | LOI wt % | GWIT °C. | Flexural modulus GPA | Impact strength kJ/m² |
|---|---|---|---|---|---|---|---|
| A | 70 | 30 | — | 25.4 | 960[1] | 4.01 | 9.7 |
| B | 80 | 20 | — | 25.2 | 960[2] | 3.62 | 10.6 |
| C | 70 | — | 30 | 20.6 | failed | 8.22 | 83.3 |
| D | 50 | — | 50 | 22.6 | failed | 13.88 | 96.2 |
| E | 30 | 20 | 50 | 27.1 | 960 | 15.89 | 28.2 |
| F | 30 | 40 | 30 | 29.5 | 960 | 13.10 | 16.9 |

[1] Test according to American specification: UL94 class V-0
[2] Test according to American specification: UL94 class V-1

From Table 1 it can be seen that the addition of microsilica gave a suprisingly higher flame retardancy than the addition of glass fibres although both microsilica and glass fibres are based on silicon dioxide. The mechanical properties can be further optimised by changing the content of microsilica and glass fibres. Further, it can be seen from Table 1 that the processability was improved as samples E and F having a very high content of glass fibres and microsilica could be processed without difficulties.

Example 2

Polyamide engineering plastics were made from a polyamide polymer PA11 delivered by Atofina.

Different amounts of microsilica and glass fibres were added to the polymer to produce samples 1, 2 and 3 according to the invention and the LOI, GWIT, flexural modulus and impact strength of the produced polyamide plastics were measured. The LOI and GWIT were measured according to the standards mentioned in Example 1. For comparison purposes two samples, sample 4 and 5, without microsilica addition were made.

The composition of the samples and the results are shown in Table 2.

TABLE 2

| Sample | PA11 wt % | Microsilica wt % | Glass-fibre wt % | LOI wt % | GWIT °C. | Flexural modulus GPA | Impact strength kJ/m² |
|---|---|---|---|---|---|---|---|
| 1 | 30 | 20 | 50 | 24.2 | 750 | 12.25 | 14.4 |
| 2 | 30 | 40 | 30 | 26.3 | 960 | 10.34 | 11.7 |
| 3 | 25 | 50 | 25 | 26.6 | 960 | 10.91 | 9.4 |
| 4 | 70 | — | 30 | 20.9 | failed | 5.09 | 29.1 |
| 5 | 50 | — | 50 | 21.2 | 750 | 7.96 | 23.0 |

From Table 2 it can be seen the very high increase in flame retardancy for samples 1 to 3 containing both microsilica and glass fibres compared to samples 4 and 5 only containing glass fibres. It is also very surprising that it was possible to process the compound of sample 3 containing only 25% polymer. This shows that the addition of microsilica improves the processing properties of the compound.

Example 3

An ethylene vinylacetate copolymer, EVA (18% vinyl acetate) delivered by Exxon was used to produce two samples of engineering plastics. One sample, sample 1 according to the invention, contained 10% microsilica and 55% aluminium trihydrate (ATH) as a filler and one sample, sample 2, for comparison purposes containing 60% ATH and no microsilica. The comparison sample, sample 2 containing 60% ATH is known to be highly flame retardant.

The samples were tested for LOI, GWIT according to the standards mentioned in Example 1. In addition elongation at break (EB), tensile strength (TS) and tensile modulus were measured. The results are shown in Table 3.

TABLE 3

| Sample | EVA wt % | MS wt % | ATH wt % | LOI wt % | GWIT °C. | TS MPa | EB % | Tensile modulus MPa |
|---|---|---|---|---|---|---|---|---|
| 1 | 34 | 10 | 55 | 38 | 960 | 12.8 | 81 | 314 |
| 2 | 39 | — | 60 | 36 | 960 | 12.6 | 83 | 276 |

Both sample 1 and sample 2 were rated in class V-0 according to UL94.

It can be seen from Table 3 that both sample 1 according to the invention and sample 2 showed very good flame retardancy even if sample 1 according to the invention has a reduced content of ATH. Thus the addition of microsilica and the reduction of ATH did not reduce the flame retardancy of the ethylene vinylacetate copolymer, measured as LOI and GWIT. It can further be seen from Table 3 that the mechanical properties, particularly the tensile modules are better for sample 1 than for sample 2.

In addition to the results in Table 3 it was found that the total heat evolved when testing sample 1 and sample 2 according to ISO 5660 was lowered for sample 1 containing microsilica and ATH compared to sample 2 containing only ATH. Also the peak of heat release rate was strongly reduced for sample 1 according to the invention compared to sample 2 containing only ATH. Finally, the CO release was lower for sample 1 than for sample 2, which indicates a more uncomplete combustion for sample 1 according to the invention.

This shows that additional flame retardancy is obtained when using microsilica together with conventional flame retarding agents. Thus when using microsilica together with conventional flame retarding agents a synergistic result is obtained.

The invention claimed is:

1. An engineering plastic consisting of:
   plastic;
   20 to 50% by weight of glass fibre;
   8-50% by weight of microsilica, wherein the microsilica has a particle size of about 0.15 μm; and
   a flame retardant additive,
   wherein the engineering plastic has high flame retardancy and good compound processability.

2. An engineering plastic consisting of
   plastic;
   20 to 50% by weight of glass fibre, and
   5-60% by weight of microsilica, wherein the microsilica has a particle size of about 0.15 μm;
   and wherein the engineering plastic has high flame retardancy and good compound processability.

3. The engineering plastic of Claim 2,
   wherein the plastic is either a polyamide or a copolymer of ethylene vinyl acetate.

* * * * *